3,287,331
SUSPENSION POLYMERIZATION PROCESS WHEREIN A HYDROXYALKYL ALKYLENE DIAMINE IS USED TO IMPROVE HAZE LEVEL
Yoonchai Lee, Springfield, and Leo P. Paradis, Wilbraham, Mass., assignors to Monsanto Company, a corporation of Delaware
No Drawing. Filed Apr. 10, 1963, Ser. No. 271,859
6 Claims. (Cl. 260—80.5)

This invention relates to styrene/acrylonitrile-type interpolymers and more particularly relates to a method of improving the optical clarity of styrene/acrylonitrile-type interpolymers prepared by a suspension process.

As is well known, suspension polymerization in the presence of water-soluble suspending agents is an advantageous technique of preparing styrene/acrylonitrile-type interpolymers but normally leads to the production of interpolymers having haze levels varying from about 3–35%, depending on the particular suspension polymerization technique employed. Since a haze level as close as possible to 0% is desired when the interpolymers are to be used in applications requiring optical clarity, it would obviously be desirable to find a method of reducing the haze of styrene/acrylonitrile-type interpolymers prepared by essentially conventional suspension processes. Such a method, in addition to providing a means of further improving the optical clarity of interpolymers prepared by a suspension polymerization technique which normally leads to interpolymers having comparatively low haze levels, e.g., 3–5%, could provide an alternative means of reducing the haze to somewhat less objectionable levels when the interpolymers are being prepared by a suspension polymerization technique which normally leads to interpolymers having high haze levels, e.g., 20–35%.

An object of the invention is to provide suspension-polymerized styrene/acrylonitrile-type interpolymers having improved optical clarity.

Another object is to provide a process for preparing suspension-polymerized styrene/acrylonitrile-type interpolymers having improved optical clarity.

These and other objects are attained by polymerizing a polymerizable material comprising a monovinylidene aromatic hydrocarbon and an unsaturated nitrile of the group consisting of acrylonitrile, methacrylonitrile, and mixtures thereof in an aqueous system in the presence of a free radical polymerization initiator and a water-soluble suspending agent, using conventional suspension polymerization techniques except for conducting the polymerization in the presence of about 0.05–0.5%, based on the weight of the polymerizable material, of a hydroxyalkyl alkylene diamine which corresponds to the formula:

$$(R-CH_2)_2N-(CH_2)_n-N(CH_2-R)_2$$

wherein each R is independently selected from the group consisting of hydroxymethyl and hydroxyethyl radicals and $n$ represents an integer of 2–6.

The following examples are given to illustrate the invention. Unless otherwise specified, quantities mentioned are quantities by weight.

EXAMPLE 1

(Control)

Copolymerize 67 parts of styrene and 33 parts of acrylonitrile in aqueous suspension, using 200 parts of water as a suspension medium, about 0.03 part of di-t-butyl peroxide as a polymerization initiator, about 0.03 part of a water-soluble acrylic acid/2-ethylhexyl acrylate (93.2:6.8) copolymer as a suspending agent, and about 0.3 part of a water-soluble sodium salt as a haze reducer. Heat a reaction mixture consisting of the water, di-t-butyl peroxide, acrylonitrile, and a major amount of the styrene at 120–150° C. in a suitable, agitated reaction vessel to the stage of about 20–40% conversion of monomers to polymer before adding the remaining ingredients of the polymerization recipe. Then add these remaining ingredients, and continue heating the reaction mixture at 120–150° C. to the stage of about 95–98% conversion to polymer. Strip the product of unreacted monomer, filter, and then wash and dry the styrene/acrylonitrile copolymer beads.

Pelletize the copolymer beads on an extruder at about 205° C., and then compression mold the pellets at about 205° C. to form a 1/8 inch-thick slab. Measure the total transmittance ($T_t$) and diffuse transmittance ($T_d$) through the slab of light having a wave length of 550 m$\mu$, and calculate the haze in accordance with the equation:

$$\text{Haze} = \frac{T_d \times 100}{T_t}$$

The coplymer has a haze level of 3%.

EXAMPLE II

Prepare two styrene/acrylonitrile copolymers by repeating Example I except for also including, respectively, 0.08 part and 0.1 part of N,N,N',N'-tetra(2-hydroxypropyl) ethylene diamine in the initial charge to the reaction vessel. The copolymers have respective haze levels of 2.4% and 1.7%.

As demonstrated above, conducting the suspension polymerization in the presence of N,N,N',N'-tetra(2-hydroxypropyl) etheylene diamine can effect as much as a 43% decrease in the haze level of the styrene/acrylonitrile copolymer. Reductions in haze are also obtained when:

(1) The entire polymerizable material is charged to the reaction vessel initially,
(2) No sodium salt or the like is employed,
(3) The suspending agent is incorporated before the polymerization is initiated,
(4) The acrylic acid/2-ethylhexyl acrylate copolymer is replaced with a water-soluble acrylic acid/2-ethylhexyl methacrylate copolymer, an acrylic acid/dodecyl acrylate copolymer, a methacrylic acid/2-ethylhexyl acrylate copolymer, a polyvinyl alcohol, a cellulose ether, or a sulfonated polystyrene,
(5) The polymerizable material consists of a styrene/acrylonitrile (50:50), styrene/methacrylonitrile (85:15), alpha-methylstyrene/acrylonitrile (80:20), styrene/alpha-methylstyrene/acrylonitrile (50:35:15), or styrene/acrylonitrile/N-t-butyl acrylamide (70:20:10) monomer mixture, or
(6) The N,N,N',N'-tetra(2-hydroxypropyl) ethylene diamine is replaced with N,N,N',N'-tetra(3-hydroxypropyl) ethylene diamine, N,N,N',N'-tetra(2-hydroxyethyl) ethylene diamine, N-2-hydroxyethyl-N,N',N'-tri (2-hydroxypropyl) ethylene diamine, N,N,N',N'-tetra (2-hydroxypropyl) propylene diamine, N,N,N',N'-tetra(2-hydroxypropyl) butylene diamine, N,N,N',N'-tetra(2-hydroxypropyl) pentamethylene diamine, or N,N,N',N'-tetra(2-hydroxypropyl) hexamethylene diamine.

The present invention is a modification of known techniques for suspension polymerizing a polymerizable material comprising a monovinylidene aromatic hydrocarbon and an unsaturated nitrile of the group consisting of acrylonitrile, methacrylonitrile, and mixtures thereof. Such polymerizable materials usually contain 5–95% by weight of a monovinylidene aromatic hydrocarbon (e.g., styrene; an ar-alkylstyrene such as the o-, m-, and p-methylstyrenes, 2,4-dimethylstyrene, ar-ethylstyrenes, p-t-butylstyrene, etc.; an alpha-alkylstyrene such as alpha-methylstyrene, alpha-ethylstyrene, alpha-methyl-p-methylstyrene, etc.; vinyl naphthalene; and mixtures thereof) and 5–59% by weight of the unsaturated nitrile and may also contain minor amounts, e.g., up to about 10% by weight, of one or more copolymerizable monomers such as an alkyl acrylate (e.g., methyl acrylate, butyl acrylate, 2-ethylhexyl acrylate, etc.), the corresponding alkyl methacrylates, an acrylamide (e.g., acrylamide, methacrylamide, an N-alkyl acrylamide such as N-methyl acrylamide, N-butyl acrylamide, etc.), a dialkyl maleate or fumarate (e.g., diethyl maleate or fumarate, dibutyl maleate or fumarate), etc.

Hydroxyalkyl alkylene diamines which are utilizable in the practice of the invention are compounds which correspond to the formula:

$$(R-CH_2)_2N-(CH_2)_n-N(CH_2-R)_2$$

wherein each R is independently selected from the group consisting of hydroxymethyl and hydroxyethyl radicals and $n$ represents an integer of 2–6. Exemplary of such compounds are N,N,N',N'-tetra(2-hydroxypropyl) ethylene diamine, N,N,N',N'-tetra(3-hydroxypropyl) ethylene diamine, N,N,N',N'-tetra(2-hydroxyethyl) ethylene diamine, N-2-hydroxyethyl-N,N',N'-tri(2-hydroxypropyl) ethylene diamine, N,N,N',N'-tetra(2-hydroxypropyl) propylene diamine, N,N,N',N'-tetra(2-hydroxypropyl) butylene diamine, N,N,N',N'-tetra(2-hydroxypropyl) pentamethylene diamine, N,N,N',N'-tetra(2-hydroxypropyl) hexamethylene diamine, etc., and mixtures thereof. The tetra(2-hydroxypropyl) alkylene diamines are especially preferred. Although the effectiveness of the hydroxyalkyl alkylene diamine generally increases with increased concentration within the utilizable range of 0.05–0.5%, based on the weight of the polymerizable material, higher concentrations are undesirable because of the deleterious effect on suspension stability.

The process of the invention, except for the novel feature of utilizing a hydroxyalkyl alkylene diamine, is conducted by conventional aqueous suspension polymerization techniques. Thus, the polymerizable material is polymerized with agitation in the presence of catalytic amounts of a free radical polymerization initiator such as a peroxy or azo compound, e.g., benzoyl peroxide, di-t-butyl peroxide, di-isopropylbenzene peroxide, t-butyl peracetate, azoisobutyronitrile, etc., and a water-soluble suspending agent such as a polyvinyl alcohol, a cellulose ether, a sulfonated polystyrene, a (meth)acrylic acid/alkyl (meth)acrylate interpolymer, etc., at temperatures in the range of 30–200° C., preferably about 50–150° C., under atmospheric or super-atmospheric pressure. The amount of water employed is such that the water/monomer ratio is in the range of 9:1 to 2:3. If desired, the reaction mixture can contain optional ingredients such as chain transfer agents, and it is frequently desirable to utilize small amounts of water-soluble inorganic salts, e.g., sodium chloride, sodium sulfate, calcium chloride, magnesium sulfate, aluminum chloride, etc., to effect a further improvement in the optical clarity of the product. These water-soluble salts, when employed, are usually used in concentrations of about 0.05–1%, based on the weight of the polymerizable material.

A preferred embodiment of the invention is its application to suspension polymerization processes utilizing as suspending agents the water-soluble interpolymers described in U.S. Patent 3,051,682, i.e., interpolymers of an unsaturated acid of the group consisting of acrylic acid, methacrylic acid, and mixtures thereof and an unsaturated ester of the group consisting of a $C_6$–$C_{18}$ alkyl acrylate, a $C_6$–$C_{18}$ alkyl methacrylate, and mixtures thereof. In such processes it is usually preferred to use about 0.005–2%, ordinarily 0.01–0.5%, by weight of the suspending agent, based on the amount of water employed, and to delay addition of the suspending agent until about 20–40% of the polymerizable material has been converted to polymer.

When the desired degree of polymerization has been obtained, unreacted monomers are removed by distillation, and the product is then cooled, dewatered, washed, and dried as in conventional suspension polymerization processes. The copolymer can then be compounded with additives such as fillers, plasticizers, antioxidants, other polymers, colorants, etc., if desired.

The products obtained by the process of the invention have lower haze values than products obtained by corresponding suspension polymerization processes which do not utilize a hydroxyalkyl alkylene diamine. Consequently, they are more valuable in molding, film, and sheet applications wherein optical clarity is desirable or necessary.

It is obvious that many variations can be made in the products and processes set forth above without departing from the spirit and scope of this invention.

What is claimed is:

1. In a suspension polymerization process for polymerizing a polymerizable material comprising a monovinylidene aromatic hydrocarbon and an unsaturated nitrile of the group consisting of acrylonitrile, methacrylonitrile, and mixtures thereof in an aqueous system in the presence of a free radical polymerization initiator and a water-soluble suspending agent, the improvement which comprises conducting the polymerization in the presence of about 0.05–0.5%, based on the weight of the polymerizable material, of a hydroxyalkyl alkylene diamine corresponding to the formula:

$$(R-CH_2)_2N-(CH_2)_n-N(CH_2-R)_2$$

wherein each R is independently selected from the group consisting of hydroxymethyl and hydroxyethyl radicals and $n$ represents an integer of 2–6.

2. The process of claim 1 wherein the polymerizable material is a mixture of styrene and acrylonitrile.

3. The process of claim 1 wherein the polymerizable material is a mixture of alpha-methylstyrene and acrylonitrile.

4. The process of claim 1 wherein the polymerizable material is a mixture of styrene, alpha-methylstyrene, and acrylonitrile.

5. The process of claim 1 wherein the water-soluble suspending agent is an interpolymer of an unsaturated acid of the group consisting of acrylic acid, methacrylic acid, and mixtures thereof and an unsaturated ester of the group consisting of a $C_6$–$C_{18}$ alkyl acrylate, a $C_6$–$C_{18}$ alkyl methacrylate, and mixtures thereof.

6. The process of claim 1 wherein the hydroxyalkyl alkylene diamine is N,N,N',N'-tetra(2-hydroxypropyl) ethylene diamine.

References Cited by the Examiner

UNITED STATES PATENTS

| 2,649,483 | 8/1953 | Huscher et al. | 260—29.6 XR |
| 2,705,227 | 3/1955 | Stamatoff | 260—45.75 |
| 3,065,200 | 10/1962 | Johansson | 260—45.9 |
| 3,100,763 | 8/1963 | Meek et al. | 260—93 |

JOSEPH L. SCHOFER, *Primary Examiner.*

W. HOOVER, *Assistant Examiner.*